(12) United States Patent
Lethellier

(10) Patent No.: US 6,664,774 B2
(45) Date of Patent: Dec. 16, 2003

(54) OFFSET PEAK CURRENT MODE CONTROL CIRCUIT FOR MULTIPLE-PHASE POWER CONVERTER

(75) Inventor: Patrice R. Lethellier, Oxnard, CA (US)

(73) Assignee: Semtech Corporation, Newbury, CA (US)

(*) Notice: Subject to any disclaimer, the term of this patent is extended or adjusted under 35 U.S.C. 154(b) by 45 days.

(21) Appl. No.: 10/112,010

(22) Filed: Mar. 27, 2002

(65) Prior Publication Data

US 2003/0185024 A1 Oct. 2, 2003

(51) Int. Cl.$^7$ ................................................. G05F 1/56
(52) U.S. Cl. ........................................ 323/282; 323/285
(58) Field of Search ......................... 363/65, 148, 149; 323/282, 284, 285, 351

(56) References Cited

U.S. PATENT DOCUMENTS

| 5,576,940 | A | | 11/1996 | Steigerwald et al. |
| 5,912,549 | A | | 6/1999 | Farrington et al. |
| 6,009,000 | A | * | 12/1999 | Siri .......................... 363/21.09 |
| 6,055,169 | A | | 4/2000 | Bowman et al. |
| 6,130,526 | A | | 10/2000 | Yang et al. |
| 6,181,120 | B1 | | 1/2001 | Hawkes et al. |
| 6,204,649 | B1 | * | 3/2001 | Roman ......................... 323/282 |
| 6,215,290 | B1 | | 4/2001 | Yang et al. |
| 6,282,111 | B1 | * | 8/2001 | Illingworth .................... 363/98 |
| 6,346,798 | B1 | * | 2/2002 | Passoni et al. ............... 323/272 |
| 6,433,522 | B1 | * | 8/2002 | Siri ............................ 323/272 |
| 6,476,589 | B2 | * | 11/2002 | Umminger et al. ......... 323/282 |

FOREIGN PATENT DOCUMENTS

WO    WO 99/30409    6/1999

OTHER PUBLICATIONS

By Lloyd Dixon; "Average Current Mode Control Of Switching Power Supplies"; Unitrode Application Note U–140, Unitrode Corporation; pp. 3–356–3–369.

* cited by examiner

Primary Examiner—Adolf D. Berhane
(74) Attorney, Agent, or Firm—O'Melveny & Myers LLP

(57) ABSTRACT

An offset peak current mode control circuit is provided for use with a multiple-phase DC-to-DC voltage converter including a plurality of converter modules connected to a common load and having a common input voltage source, a current sensor coupled to a sensing resistor disposed in series between the common input voltage source and the load to derive a current sense signal corresponding to current passing through the sensing resistor, and a voltage error sensor coupled to the load to derive a voltage error signal corresponding to difference between an output voltage of the voltage converter and a reference voltage. When the DC-to-DC voltage converter is operated with a relatively low input voltage or a relatively high duty cycle resulting in an overlap of the current sense signal, the offset peak current mode control circuit utilizes information from the clean (i.e., non-overlapping) portion of the current sense signal, and then stretches the duty cycle applied to an associated voltage converter module so that it extends into the time of the overlapping portion of the current sense signal.

20 Claims, 3 Drawing Sheets

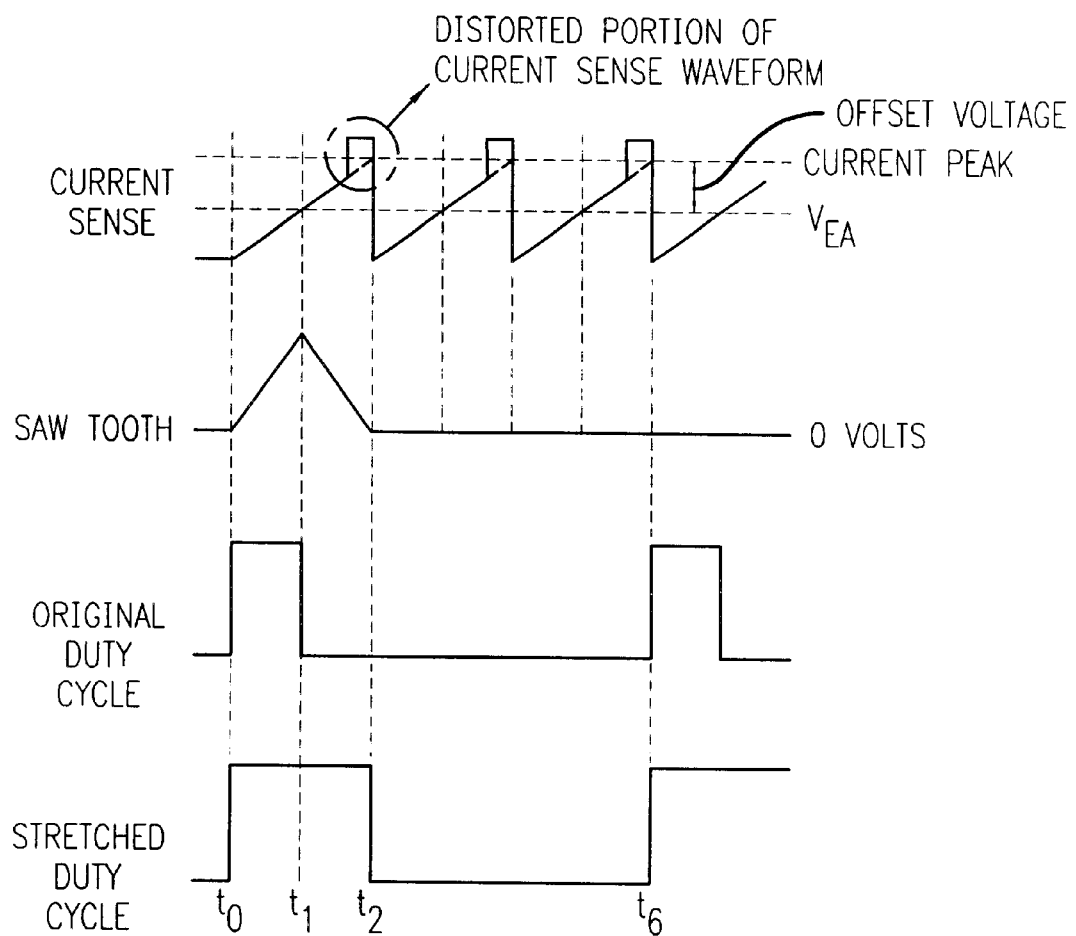

OFFSET PEAK CURRENT MODE CONTROL CIRCUIT FOR MULTIPLE-PHASE POWER CONVERTER

BACKGROUND OF THE INVENTION

1. Field of the Invention

The present invention relates to voltage regulator circuits. More particularly, the invention relates to offset peak current mode control for multiple-phase DC-to-DC switched mode power converters.

2. Description of Related Art

Switched mode DC-to-DC power converters are commonly used in the electronics industry to convert an available direct current (DC) level voltage to another DC level voltage. A switched mode converter provides a regulated DC output voltage by selectively storing energy by switching the flow of current into an output inductor coupled to a load. A synchronous buck converter is a particular type of switched mode converter that uses two power switches, such as MOSFET transistors, to control the flow of current in the output inductor. A high-side power switch selectively couples the inductor to a positive power supply while a low-side power switch selectively couples the inductor to ground. A pulse width modulation (PWM) control circuit is used to control the gating of the high-side and low-side power switches. Switched mode power converters generally offer high efficiency and high power density, particularly when MOSFET devices are used for the power switches due to their relatively low on-resistance. Therefore, switched mode power converters are used to provide power to electronic systems having demanding power requirements, such as microprocessors that require a control voltage (Vcc) of 1 to 1.5 volts with current ranging from 40 to 60 amps.

For certain applications having especially high current load requirements, it is known to combine plural switched mode power converters together in multiple-phase configurations operated, in an interleaf mode. Each individual switched mode power converter of the multiple-phase power converter operates during a portion of the power cycle, so that there are multiple power pulses per cycle. As a result, the interleaved multiple-phase power converter can produce more power than can the individual single-phase power converters. Another advantage of interleaved operation is that the output current ripple across the load is effectively reduced, thereby enabling the use of smaller filter capacitors to eliminate the current ripple. Thus, multiple-phase power converters can be smaller, lighter, and less costly than single-phase power converters.

It is necessary to regulate the performance of a switched mode power converter in order to protect the load from damage caused by excessive current, ensure that sufficient current is delivered to the load in view of changing load conditions (i.e., controlling voltage "droop" caused by a step load), and permit current sharing between phases of multiphase converters. In current-mode regulation, a first feedback loop senses the output voltage and a second feedback loop senses the current delivered to the load. The first feedback loop compares the output voltage to a reference to derive a voltage error signal. The second feedback loop provides a voltage proportional to the sensed current. The voltage error signal is compared with the current sense signal by the PWM circuit to thereby control the duty cycle that determines the on time of the power switches. The voltage error signal can be proportional to the intra-cycle peaks of the sensed current (known as peak current control), or can be proportional to the average value of the sensed current (known as average current control).

In a switched mode converter, the average inductor current is higher at a low DC input voltage than it is at a high DC input voltage, thereby requiring longer on-time of the power switches to achieve the same output power when a low DC input voltage is utilized. This phenomenon precludes the use of peak current control with multiplephase power converters if the longer on-times result in an overlap of the duty cycles applied to the separate phases. For example, such an overlap may occur with a three-phase converter having a relatively low input voltage (e.g., 5 volts or less) in which the duty cycle applied to each phase is increased beyond 33%. The overlap causes the current sense signal to become distorted at the peak portion so that a clean comparison between the current sense signal and the voltage error signal cannot be obtained.

Accordingly, it would be desirable to provide current mode control for a multiple-phase power converter operated with a relatively low input voltage or a relatively high duty cycle. More specifically, it Would be desirable to provide current mode control of a multiple-phase power converter that utilizes information from the clean (i.e., non-overlapping) portion of the current sense signal.

SUMMARY OF THE INVENTION

The present invention provides an offset peak current mode control circuit for use with a multiple-phase DC-to-DC voltage converter. When the DC-to-DC voltage converter is operated with a relatively low input voltage or a relatively high duty cycle resulting in an overlap of the current sense signal, the offset peak current mode control circuit utilizes information from the clean (i.e., non-overlapping) portion of the current sense signal, and then stretches the duty cycle applied to an associated voltage converter module so that it extends into the time of the overlapping portion of the current sense signal.

In an embodiment of the invention, a multiple-phase DC-to-DC voltage converter comprises a plurality of converter modules connected to a common load and having a common input voltage source. A current sensor is coupled to a sensing resistor disposed in series between the common input voltage source and the load to derive a current sense signal corresponding to current passing through the sensing resistor. A voltage error sensor is coupled to the load to derive a voltage error signal corresponding to difference between an output voltage of the voltage converter and a reference voltage. A current mode control circuit is connected to each respective one of the plurality of converter modules. The current mode control circuits receive the current sense signal and the voltage error signal, and provide gate driving signals to the respective converter module having a duty cycle determined by the current sense signal and the voltage error signal. A phase select circuit is coupled to the current mode control circuits and alternately provides the current mode control circuits with a phase select signal to initiate successive phases of operation Within a power cycle. When there is an overlap between adjacent ones of the successive phases, the current mode control circuits are operative to compare the current sense signal and the voltage error signal during a non-overlapping portion of a phase, and stretch a duration of the duty cycle of the gate driving signals to extend at least partially into an overlapping portion of the phase.

Another embodiment of the invention provides a method for providing offset peak current mode control of one of a plurality of converter modules of a multiple-phase DC-to-DC voltage converter when there is an overlap between adjacent phases of operation of the plurality of converter modules. The multiple-phase DC-to-DC voltage converter comprises a plurality of converter modules connected to a common load and having a common input voltage source. A first step of the method includes sensing output current delivered to the common load to thereby determine a current sense signal representative of the current. The current sense signal includes a clean portion prior to the overlap and a distorted portion during the overlap. A second step includes sensing output voltage across the common load to thereby determine a voltage error signal representative of a difference between the output voltage and a reference. A third step includes comparing the current sense signal with the voltage error signal during the clean portion of the current sense signal to thereby generate an intermediate gate-driving signal. A fourth step includes stretching the intermediate gate-driving signal to provide a final gate drive signal. And, a fifth step includes controlling operation of an associated one of the converter modules using the final gate drive signal.

In another embodiment of the invention, an offset peak current mode control circuit is provided for use in a multiple-phase DC-to-DC voltage converter. As in the preceding embodiments, the multiple-phase DC-to-DC voltage converter includes a plurality of converter modules connected to a common load and having a common input voltage source, a current sensor coupled to a sensing resistor disposed in series between the common input voltage source and the load to derive a current sense signal corresponding to current passing through the sensing resistor, and a voltage error sensor coupled to the load to derive a voltage error signal corresponding to difference between an output voltage of the voltage converter and a reference voltage. The current mode control circuit includes a first circuit portion for comparing the current sense signal and the voltage error signal during a non-overlapping portion of a phase, and a second circuit portion for stretching a duration of the duty cycle of the gate driving signals to extend at least partially into an overlapping portion of the phase.

A more complete understanding of the offset peak current mode control circuit for a multiple-phase power converter will be afforded to those skilled in the art, as well as a realization of additional advantages and objects thereof, by a consideration of the following detailed description of the preferred embodiment. Reference will be made to the appended sheets of drawings that will first be described briefly.

BRIEF DESCRIPTION OF THE DRAWINGS

FIG. 3 is a graph illustrating exemplary current sense, saw tooth and duty cycle waveforms of the multiple-phase voltage converter.

DETAILED DESCRIPTION OF THE PREFERRED EMBODIMENT

The present invention satisfies the need for current mode control for a multiple-phase power converter operated with a relatively low input voltage or a relatively high duty cycle. In the detailed description that follows, like element numerals are used to describe like elements illustrated in one or more of the drawings.

Figure 1:
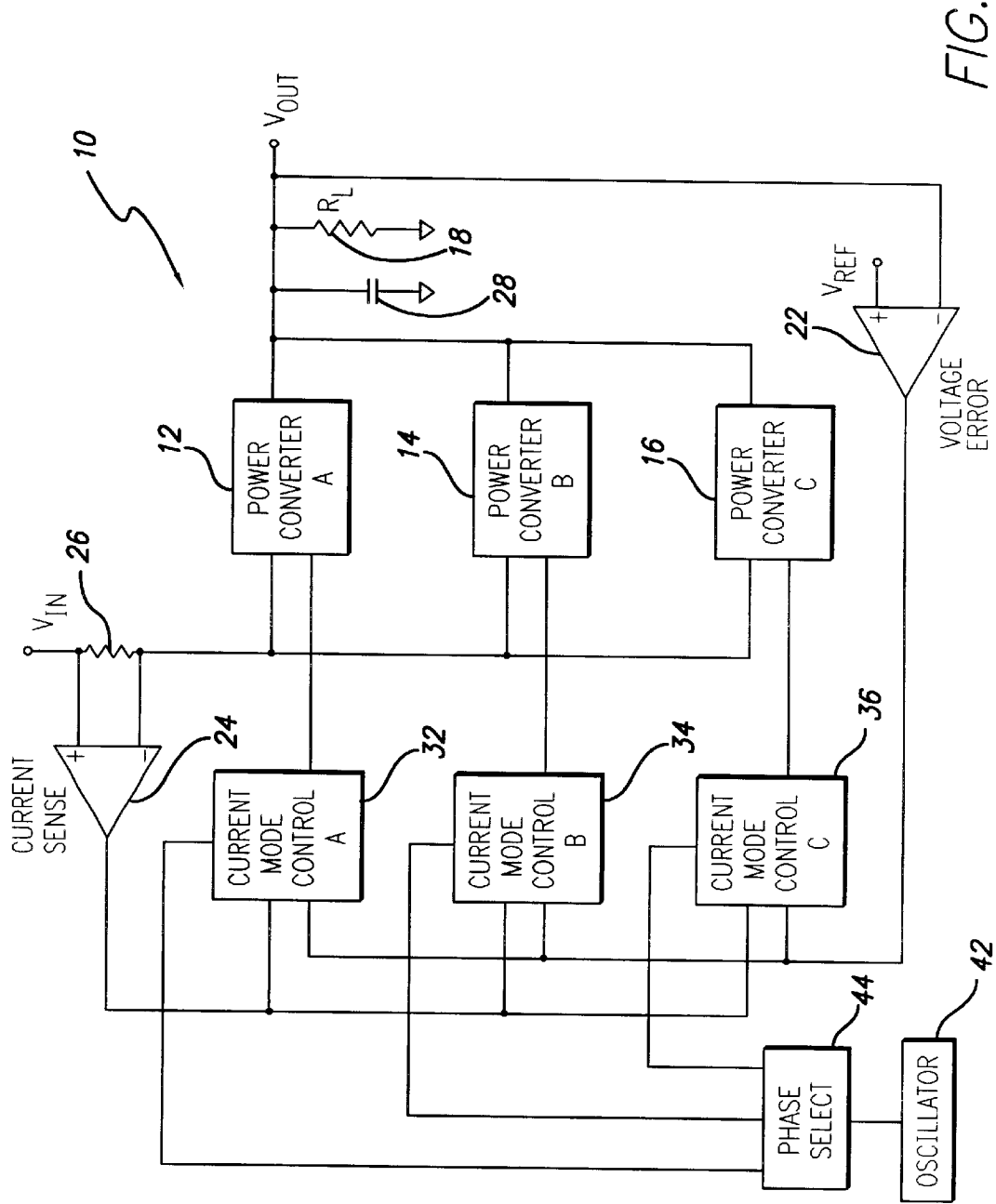
FIG. 1 is a block diagram of a multiple-phase DC-to-DC voltage converter having offset peak current mode control in accordance with the present invention.

Referring first to FIG. 1, an exemplary multiple-phase DC-to-DC voltage converter 10 is illustrated in accordance with an embodiment of the invention. The multiple-phase DC-to-DC voltage converter 10 includes three single-phase power converter modules 12, 14 and 16 that are connected in parallel to provide a regulated output voltage ($V_{OUT}$) to a load 18 (illustrated as resistor ($R_L$)). A filter capacitor 28 is connected to the power converter modules 12, 14, 16 in parallel with the load 18 to provide smoothing of the output voltage $V_{OUT}$. An input voltage source ($V_{IN}$) is connected to each of the power converter modules 12, 14, 16. The power converter modules 12, 14, 16 each further receive a drive signal from respective current mode control circuits 32, 34, 36, respectively. It should be appreciated that the present invention is not limited to a three-phase voltage converter, and that the multiple-phase voltage converter may have a different number of converter modules as known in the art. In a preferred embodiment of the invention, the power converter modules 12, 14, 16 each further comprises a synchronous buck converter, but it should be appreciated that alternative topologies such as boost and inverter converters could also be advantageously utilized.

The current mode control circuits 32, 34, 36 each receive a voltage error signal and a current sense signal. A voltage error circuit includes differential amplifier 22 that compares the output voltage ($V_{OUT}$) to a reference voltage ($V_{REF}$), and provides the voltage error signal. The voltage error circuit may further include a voltage divider (not shown) that reduces the output voltage ($V_{OUT}$) to a lower voltage for comparison to the reference voltage ($V_{REF}$). A current sense circuit includes sense resistor 26 and differential amplifier 24. The sense resistor 26 is connected in series between the input voltage source ($V_{IN}$) and the power converter modules 12, 14, 16 such that the current passing through the sense resistor 26 corresponds to the current drawn by the load 18. The differential amplifier 24 measures the voltage across the sense resistor 26 and provides the current sense signal having a voltage corresponding the current through the resistor 26. It should be appreciated that the current sense signal can also be recovered from other parts of the multiple-phase voltage converter 10, such as through the output inductors of the power converter modules 12, 14, 16 or through the on-resistance between drain and source of the power switches ($R_{DSON}$). But, it is generally preferred to have the sense resistor 26 in series with the input voltage source ($V_{IN}$) since that configuration enables all three phases to share a single current sense circuit, thereby minimizing the cost and complexity of the multiple-phase voltage converter.

The current mode control circuits 32, 34, 36 each further receive a phase select input from phase select circuit 44. The phase select circuit 44 is further connected to an oscillator 42 that provides a clock signal. The current mode control circuits 32, 34, 36 are synchronous with different phases, and are turned on at different times. The phase select circuit 44 successively selects one of the current mode control circuits 32, 34, 36 for operation in phase within each power cycle by providing a corresponding clock pulse from the oscillator 42. It should therefore be understood that a power cycle would comprise three successive clock pulses in accordance with the exemplary three-phase voltage converter.

Figure 2:
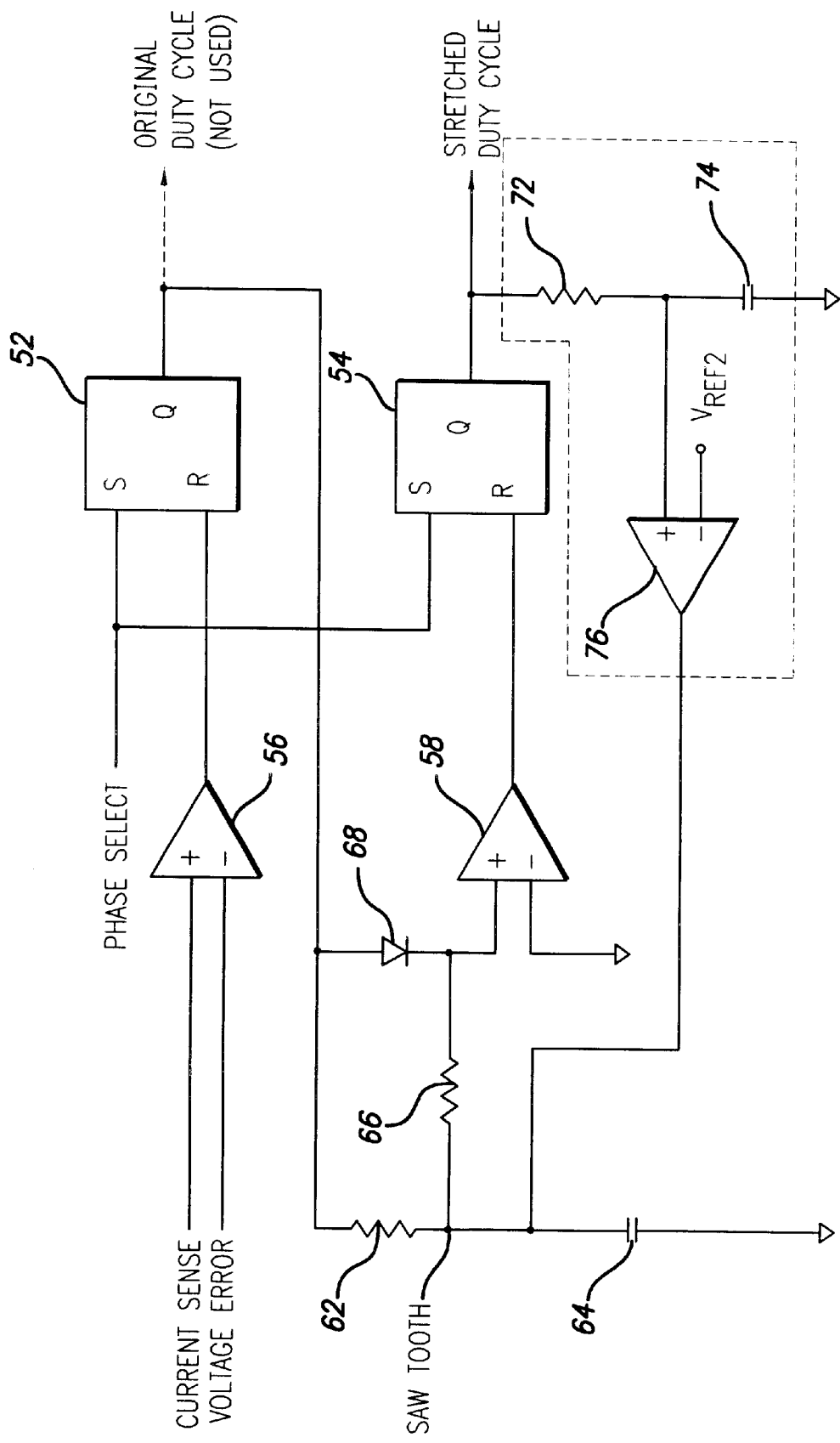
FIG. 2 is a block diagram of an exemplary offset peak current mode control circuit.

Referring now to FIG. 2, an exemplary offset peak current mode control circuit is shown. The current mode control circuit of FIG. 2 corresponds to any one of the current mode control circuits 32, 34, and 36 of FIG. 1. The current mode control circuit includes SR latches 52, 54, PWM comparator 56, resistors 62, 66, diode 68, capacitor 64, and differential amplifier 58. The S input terminals of the SR latches 52, 54 are connected to the phase select circuit 44 (see FIG. 1), which sets the latches at the start of a phase. The PWM comparator 56 receives the current sense signal and voltage error signal, and provides an output signal to the R input terminal of SR latch 52 to reset the latch. The Q output terminal of the SR latch 52 is connected to ground through resistor 62 and capacitor 64. The inverting input terminal of differential amplifier 58 is connected to ground, and the non-inverting input terminal is connected to capacitor 64 through resistor 66. The diode 68 is connected between the Q output terminal of the SR latch 52 and the non-inverting input terminal of differential amplifier 58. The differential amplifier 58 provides an output signal to the R input terminal of the SR latch 54. The Q output terminal of the SR latch 54 provides the on-off switching signal used to drive the power switches of the associated power converter module.

The operation of the exemplary offset peak current mode control circuit of FIG. 2 is now described in connection with the waveforms illustrated in FIG. 3. An exemplary current sense signal has a generally periodic shape with a ramp portion and abrupt step portion (shown in FIG. 3). The step portion corresponds to an overlap between two successive phases in which the power transistors of two separate power converter modules are conducting at the same time. The step portion of the current sense signal comprises a distortion of the current sense signal that prevents the clean detection of a peak of the current sense signal during a single phase of the power cycle. In FIG. 3, the current sense signal is shown in relation to the voltage level of the voltage error signal ($V_{EA}$). The estimated peak current level is also shown as occurring during the distortion of the current sense signal, thereby precluding the use of convention peak current mode control. There is an offset voltage between the estimated peak current level and the voltage error signal.

As described above, the PWM comparator 56 compares the current sense signal to the voltage error signal. The SR latch 52 is set at time $t_0$ when the S terminal receives the phase select signal, causing the Q output to go high. The voltage of the current sense signal rises above the voltage error signal at time $t_1$, causing the output of the PWM comparator 56 to turn positive and further causing the Q output of the SR latch 52 to return low. This is shown in FIG. 3 as the original duty cycle, which in the prior art was used to drive the power switches of the associated power converter module. It should be understood that the original duty cycle is no longer used to drive the power switches, as will be further described below.

When the Q output of the SR latch 52 goes high, the capacitor 64 is charged through the resistor 62. Then, when the Q output of the SR latch 52 goes low, the capacitor 64 is discharged. This results in a saw tooth waveform as shown in FIG. 3 at the connection between resistor 62 and capacitor 64. The differential amplifier 58 compares the voltage of the saw tooth waveform with ground. The SR latch 54 is set at time $t_0$ when the S terminal receives the phase select signal, causing the Q output to go high. The diode 68 causes the voltage at the non-inverting input-of the differential amplifier 58 to remain above zero at the start of the saw tooth waveform. As long as the voltage of the saw tooth waveform is above ground, the output of the PWM comparator 56 remains positive. At time $t_2$, the capacitor 64 has fully discharged and the saw tooth waveform returns to ground, causing the Q output of the SR latch 54 to go low. This is shown in FIG. 3 as the stretched duty cycle, which is used in the present invention to drive the power switches of the associated power converter module. Thus, the stretched duty cycle has a pulse width that is double that of the original duty cycle.

The offset peak current mode control circuit then remains dormant for then next two phases, during which time the other two current mode control circuits are successively active. Then, at time $t_6$, the current mode control circuit receives the phase select signal and the process repeats again.

In an embodiment of the present invention, the offset peak current mode control circuit further includes a circuit that disables the duty cycle stretching when the duty cycle is below 33%. This allows the same offset peak-current mode control circuit to be used in either high input voltage (e.g., 12 volts) power converters or low input voltage (e.g., 5 volts) power converters. As noted above, a high DC input voltage requires shorter on-time of the power switches than a low DC input voltage. When the current mode control circuit is used with a high DC input voltage (e.g., 12 volts), there would not be an overlap of the phases and the duty cycle would be less than 33%.

The disabling circuit further includes resistor 72, capacitor 74, and differential amplifier 76. Resistor 72 and capacitor 74 are connected between the Q output of SR latch 54 and ground. The non-inverting input terminal of the differential amplifier 76 is connected to the capacitor 74, and the inverting input terminal is connected to a reference voltage ($V_{REF2}$). The output of the differential amplifier 76 is connected to the capacitor 64. The capacitor 74 is charged by the stretched duty cycle produced by the SR latch 54. The differential amplifier 76 compares the voltage across the capacitor 74 to the reference voltage ($V_{REF2}$). The reference voltage ($V_{REF2}$) is selected to be equal to the average voltage across the capacitor 76 when a 33% duty cycle is utilized. When the duty cycle produced by the SR latch 54 is greater than 33%, the output of the differential amplifier 76 is positive and the current mode control circuit operates as described above. But, when the duty cycle produced by the SR latch 54 is less than 33%, the output of the differential amplifier 76 is negative, which prevents the capacitor 64 from charging. As a result, the SR latch 54 will operate the same as the SR latch 52, with the diode 68 providing the triggering signal to the differential amplifier 58 to start and stop the duty cycle.

Having thus described a preferred embodiment the offset peak current mode control circuit for a multiple-phase power converter, it should be apparent to those skilled in the art that certain advantages of the described method and system have been achieved. It should also be appreciated that various modifications, adaptations, and alternative embodiments thereof may be made within the scope and spirit of the present invention. The invention is further defined by the following claims.

What is claimed is:

1. A multiple-phase DC-to-DC voltage converter comprising:
 a plurality of converter modules connected to a common load and having a common input voltage source;
 a current sensor coupled to a sensing resistor disposed in series between said common input voltage source and said load to derive a current sense signal corresponding to current passing through said sensing resistor;
 a voltage error sensor coupled to said load to derive a voltage error signal corresponding to difference between an output voltage of said voltage converter and a reference voltage;

a plurality of current mode control circuits connected to respective ones of said plurality of converter modules, said current mode control circuits receiving said current sense signal and said voltage error signal, said current mode control circuit providing gate driving signals to said converter modules having a duty cycle determined by said current sense signal and said voltage error signal; and a phase select circuit coupled to said plurality of current mode control circuits and alternately providing said plurality of current mode control circuits a phase select signal to initiate successive phases of operation within a power cycle;

wherein, when there is an overlap between adjacent ones of said successive phases, said current mode control circuits are operative to compare said current sense signal and said voltage error signal during a non-overlapping portion of a phase, and stretch a duration of said duty cycle of said gate driving signals to extend at least partially into an overlapping portion of said phase.

2. The multiple-phase DC-to-DC voltage converter of claim 1, wherein said current mode control circuits further comprise a pulse width modulator receiving said voltage error signal and said current sense signal, said pulse width modulator providing an output signal having an initial duty cycle having zero and non-zero portions.

3. The multiple-phase DC-to-DC voltage converter of claim 2, wherein said pulse width modulator further comprises a first comparator providing an output signal corresponding to a difference between said voltage error signal and said current sense signal, and a first latch connected to said first comparator and providing said output signal, wherein said output signal returns to said zero portion from said non-zero portion when said current sense signal exceeds said voltage error signal.

4. The multiple-phase DC-to-DC voltage converter of claim 2, wherein said current mode control circuits further comprise a capacitor coupled. to said pulse width modulator, said capacitor charging during said non-zero portion of said initial duty cycle and discharging during said zero portion of said initial duty cycle.

5. The multiple-phase DC-to-DC voltage converter of claim 4, wherein said current mode control circuits further comprise a second comparator providing an second output signal corresponding to a difference between a charge voltage of said capacitor and ground, and a second latch connected to said second comparator and providing said gate driving signals.

6. The multiple-phase DC-to-DC voltage converter of claim 1, further comprising a disabling circuit adapted to restore an initial duration of said duty cycle of said gate driving signals when there is no overlap between adjacent ones of said successive phases.

7. The multiple-phase DC-to-DC voltage converter of claim 1, wherein said plurality of converter modules further comprises three converter modules.

8. In a multiple-phase DC-to-DC voltage converter comprising a plurality of converter modules connected to a common load and having a common input voltage source, a method for providing current mode control of one of said plurality of converter modules when there is an overlap between adjacent phases of operation of said plurality of converter modules comprises the steps of:

sensing output current delivered to said common load to thereby determine a current sense signal representative of the current, said current sense signal comprising a clean portion prior to the overlap and a distorted portion during the overlap;

sensing output voltage across said common load to thereby determine a voltage error signal representative of a difference between the output voltage and a reference;

comparing said current sense signal with said voltage error signal during said clean portion of said current sense signal to thereby generate an intermediate gate driving signal;

stretching said intermediate gate driving signal to provide a final gate drive signal; and controlling operation of said one of said converter modules using said final gate drive signal.

9. The method of claim 8, further comprising alternately providing one of said plurality of current mode control circuits with said final gate drive signal.

10. The method of claim 8, wherein said stretching step further comprises charging a capacitor during a non-zero portion of said intermediate gate driving signal and discharging said capacitor during a zero portion of said intermediate gate driving signal.

11. The method of claim 8, wherein said stretching step further comprises doubling a pulse width of said intermediate gate driving signal.

12. The method of claim 8, wherein said first sensing step further comprises measuring a voltage across a sensing resistor connected in series between said common load and said common input voltage source.

13. The method of claim 8, further comprising controlling operation of said one of said converter modules using said intermediate gate drive signal when there is no overlap between adjacent ones of said successive phases.

14. A current mode control circuit for use in a multiple-phase DC-to-DC voltage converter comprising a plurality of converter modules connected to a common load and having a common input voltage source, a current sensor coupled to a sensing resistor disposed in series between said common input voltage source and said load to derive a current sense signal corresponding to current passing through said sensing resistor, a voltage error sensor coupled to said load to derive a voltage error signal corresponding to difference between an output voltage of said voltage converter and a reference voltage, said current mode control circuit providing gate driving signals to an associated one of said converter modules having a duty cycle determined by said current sense signal and said voltage error signal, said current mode control circuit comprising:

means for comparing said current sense signal and said voltage error signal during a non-overlapping portion of a phase; and means for stretching a duration of said duty cycle of said gate driving signals to extend at least partially into an overlapping portion of said phase.

15. The current mode control circuit of claim 14, wherein said comparing means further comprises a pulse width modulator receiving said voltage error signal and said current sense signal, said pulse width modulator providing an output signal having an initial duty cycle having zero and non-zero portions.

16. The current mode control circuit of claim 15, Wherein said pulse width modulator further comprises a first comparator providing an output signal corresponding to a difference between said voltage error signal and said current sense signal, and a first latch connected to said first comparator and providing said output signal, wherein said output signal returns to said zero portion from said non-zero portion when said current sense signal exceeds said voltage error signal.

17. The current mode control circuit of claim 15, wherein said stretching means further comprises a capacitor coupled to said pulse width modulator, said capacitor charging during said non-zero portion of said initial duty cycle and discharging during said zero portion of said initial duty cycle.

18. The current mode control circuit of claim 17, wherein said stretching means further comprises a second comparator providing an second output signal corresponding to a difference between a charge voltage of said capacitor and ground, and a second latch connected to said second comparator and providing said gate driving signals.

19. The current mode control circuit of claim 14, further comprising means for restoring an initial duration of said duty cycle of said gate driving signals when there is no overlap between adjacent ones of said successive phases.

20. The current mode control circuit of claim 14, further comprising means for synchronously initiating operation of said comparing and stretching means at a start of one of said successive phases.

* * * * *